United States Patent [19]

Commette et al.

[11] 4,377,256
[45] Mar. 22, 1983

[54] APPARATUS FOR DISPENSING A MIXTURE OF MUTUALLY REACTIVE LIQUIDS

[75] Inventors: Denis S. Commette, Mantoloking; John W. Valentine, Bayville, both of N.J.

[73] Assignee: Gusmer Corporation, Lakewood, N.J.

[21] Appl. No.: 276,257

[22] Filed: Jun. 22, 1981

[51] Int. Cl.³ .............................................. B05B 15/02
[52] U.S. Cl. ................................. 239/117; 239/123; 239/600
[58] Field of Search ............................... 239/114–118, 239/123, 600, 413; 222/129, 135, 145, 134; 366/177, 182, 189; 425/4, 562; 134/37

[56] References Cited

U.S. PATENT DOCUMENTS

| | | | |
|---|---|---|---|
| 3,189,325 | 6/1965 | Levy | 239/114 X |
| 3,203,675 | 8/1965 | Ward | 366/177 X |
| 3,263,928 | 8/1966 | Gusmer | 239/142 X |
| 3,848,624 | 11/1974 | Banike | 239/117 X |
| 3,920,223 | 11/1975 | Krueger | 366/177 X |
| 3,930,619 | 1/1976 | Levey et al. | 239/602 X |
| 4,043,486 | 8/1977 | Wisbey | 222/134 |
| 4,053,283 | 10/1977 | Schneider | 239/117 X |
| 4,068,829 | 1/1978 | Laurent | 366/177 |
| 4,070,008 | 1/1978 | Schlieckmann | 366/189 X |
| 4,133,483 | 1/1979 | Henderson | 239/118 |

*Primary Examiner*—John J. Love
*Assistant Examiner*—Gene A. Church
*Attorney, Agent, or Firm*—Young & Thompson

[57] ABSTRACT

Apparatus for dispensing a mixture of mutually reactive liquids, such as a hardenable plastic foam, comprises a metal housing with a plastic mixing chamber disposed in the housing and having a bore therethrough in which a purging rod reciprocates to clean reactive mixture from the bore. The reactive liquids are separately introduced into the bore through the mixing chamber via valve assemblies whose metal housings extend through the plastic mixing chamber and terminate at the bore. The purging rod retracts rearwardly into a scraper that is immediately behind the inlet openings for the liquids, the scraper being disposed in a recess in the rear of the plastic mixing chamber. The plastic mixing chamber is compressed rearwardly, so that it seals against the valve housings and the scraper. Also, the valve housings have a crush fit with the plastic of the mixing chamber, to augment the seal. Air nucleation can be provided, by feeding the air radially inwardly through the wall of the bore between the liquid inlet openings and the scraper.

19 Claims, 13 Drawing Figures

APPARATUS FOR DISPENSING A MIXTURE OF MUTUALLY REACTIVE LIQUIDS

The present invention relates to apparatus for dispensing a mixture of mutually reactive liquids, for example a resin and its hardener. The apparatus of the present invention is of the general type of U.S. Pat. No. 3,263,928, the disclosure of which is incorporated herein by reference.

In such apparatus, as is well known, two components are introduced separately into a cylindrical mixing chamber from which they are directly dispensed. A cylindrical rod having about the same external diameter as the internal diameter of the mixing chamber, moves forwardly and rearwardly in the mixing chamber, from a position to the rear of the opposed inlets, to a forward position in which the forward end of the rod is in or extends beyond the forward end of the mixing chamber, whereby movement of the rod to the rear position exposes the inlets to permit their respective liquids to flow into the mixing chamber and mix therein; whereas forward movement of the rod purges the mixed liquids from the chamber. In the case of mutually reactive liquids such as the components of synthetic resins, this purging action is quite important, because it prevents the accumulation and solidification of cured synthetic resin within the equipment, and so prevents the equipment from becoming plugged and stuck with hardened resin.

Despite many advances in this field, of which that of the above-identified patent was surely the most notable, a number of problems have continued to plague such equipment. In the first place, because of the relatively high pressures of the liquids involved and the need to prevent leakage of mutually reactive liquid mixtures between various parts of the equipment, it has been necessary to machine the parts with high precision. This has added greatly to the expense of the equipment and really has not been successful in completely preventing undesirable leakage. In the second place, it has been difficult to ensure the complete purging of the reactive mixed liquids from the equipment to the extent that residual pockets of reactive mixture would not collect and harden, thereby impeding or preventing the operation of the equipment.

It is accordingly an object of the present invention to provide such equipment, which improves the ability of the component parts to seal against each other, thereby to avoid the leakage of reactive liquids between the parts.

Another object of the present invention is the provision of such equipment, in which the opportunity for reactive liquid to collect and remain in the equipment is substantially reduced as compared to known equipment.

It is also an object of the present invention, to provide such equipment having improved structure for introducing air into the mixing chamber.

Finally, it is an object of the present invention to provide such equipment, which will be relatively simple and inexpensive to manufacture, easy to assemble and disassemble, operate, maintain and repair, and rugged and durable in use.

Other objects and advantages of the present invention will become apparent from a consideration of the following description, taken in connection with the accompanying drawings, in which.

OVERALL CONFIGURATION

Figure 1:
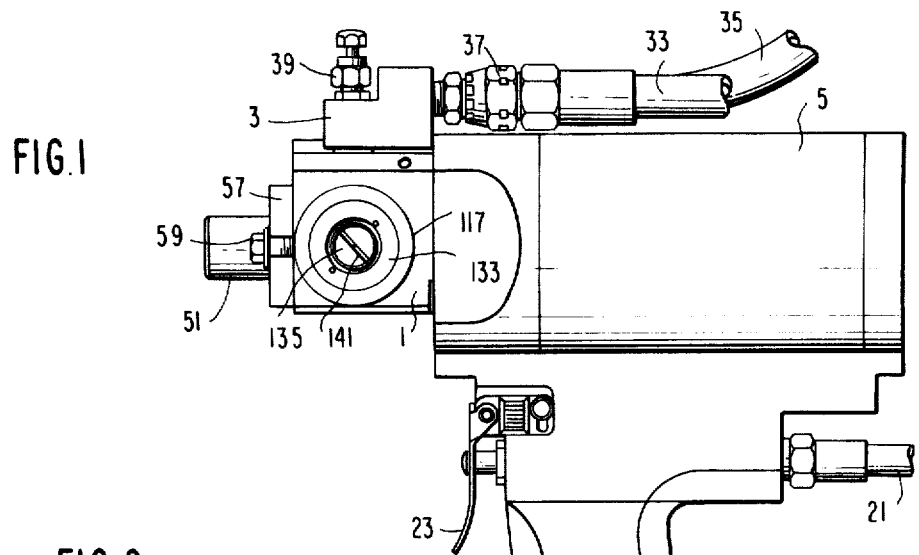
FIG. 1 is a side elevational view of apparatus according to the present invention.
Figure 2:
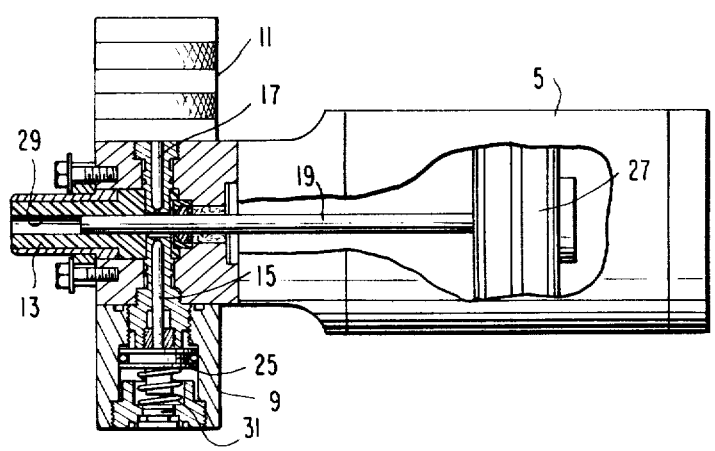
FIG. 2 is a top plan view of FIG. 1, with parts broken away to show the internal construction thereof.

Referring now to the drawings in greater detail, and first to FIGS. 1 and 2 thereof, the overall arrangement of the present invention can be quickly understood if it is considered that the illustrated embodiment is in the form of what is called in this art a "pour gun" for dispensing a foaming mixture of resin and hardening agent for the resin. Such guns are useful inter alia in packaging and in applying insulation material, and are characterized in that they dispense a continuous stream of material, in contrast to a dispenser of the spray gun type from which discrete particles are ejected.

As seen in FIG. 1, therefore, the gun of the present invention comprises a gun block 1 into which the reactive materials are fed and in which the materials mix and from which the mixture is dispensed, a coupling block 3 which transfers the reactive materials from conventional separate sources thereof to gun block 1, an air cylinder 5 for operating the reciprocating parts of the apparatus as will be described hereinafter, and a handle 7 by which the operator supports and positions the apparatus.

GUN BLOCK

Supported by gun block 1 are two opposed valve assemblies 9 and 11, one for each of the mutually reactive components. In the illustrated embodiment, valve assembly 9 introduces and controls the flow of the hardener; while valve assembly 11 introduces and controls the flow of the resin. Apart from small differences in dimension, valve assemblies 9 and 11 are identical to each other and are coaxial and so need not be separately described.

The hardener and resin separately introduced through valve assemblies 9 and 11 flow into a mixing chamber 13 under the control of needle valves 15 and 17 that are mounted for reciprocation in valve assemblies 9 and 11, respectively. Valves 15 and 17 may be in the form of a metal core coated with nylon, as in U.S. Pat. No. 3,876,145, the disclosure of which is incorporated herein by reference as to this feature.

A cylindrical purging rod 19 reciprocates in mixing chamber 13, from a rear position to the rear of needle valves 15 and 17, to a forward position in which it completely fills the mixing chamber and expels substantially all the reactive mixture therefrom.

The gun of the present invention is air controlled; and for this purpose, an air inlet 21 is provided, for air under pressure; and a trigger lever 23 is pivotally mounted adjacent handle 7, such that when lever 23 is pulled, air under pressure is admitted to the gun. Pistons 25 are provided, for moving the needle valves 15, 17 to open position, that is, away from each other; while a piston 27 in air cylinder 5 is provided, for moving purging rod 19 selectively in either direction in the cylindrical bore 29 of mixing chamber 13. When lever 23 is pulled, air under pressure is admitted to the left of piston 27 as seen in FIG. 2, which retracts purging rod 19 to its rearmost position; while when trigger lever 23 is released, compressed air is applied to the opposite or right side of piston 27 as seen in FIG. 2, thereby positively to move piston 27 and purging rod 19 to the left as seen in FIG. 2, until rod 19 occupies the position shown in FIG. 3. This operation of air cylinder 5 is completely conventional and so need not be described in greater detail.

Pulling lever 23 also applies compressed air to pistons 25 of the valve assemblies, to move needle valves 15 and 17 apart against the action of springs 31. Release of the trigger lever 23 lets the springs 31 return valves 15 and 17 to their closed position.

COUPLING BLOCK

The coupling block 3 is detachably secured atop gun block 1. A heated hose 33 for hardener, and a heated hose 35 for resin, supply the hardener and resin separately to coupling block 3 through couplings 37 carried by coupling block 3. Only the hardener coupling 37 is visible in FIG. 1. The coupling 37 for the resin is invisible in FIG. 1 because it is directly behind it. Valves 39, one for the hardener and one for the resin, are also provided for the manual control of the flow of the two components through the coupling block; and again, only the valve 39 for the hardener is visible in FIG. 1.

MIXING CHAMBER

A very important feature of the present invention is that the mixing chamber 13 is of an elastically deformable plastic, e.g. high-density polyethylene. As a result, the purging rod 19, which can be of steel, can slide readily therein and reactive mixture does not tend to stick to the side walls of bore 29. But these properties of a plastic liner for a mixing chamber are already known in the art, e.g., from U.S. Pat. No. 3,189,325. In addition, however, the plastic mixing chamber of the present invention makes use of the properties of the plastic material of the mixing chamber, in a number of ways that are novel in this art, as will appear hereinafter.

Figure 5:
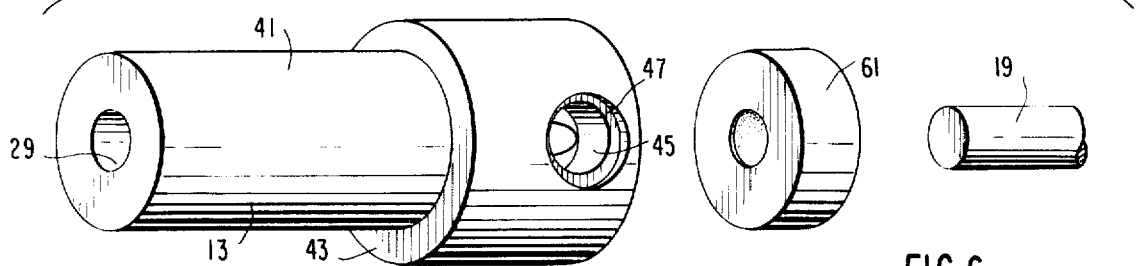
FIG. 5 is an exploded front perspective view of the mixing chamber assembly of the present invention.
Figure 6:
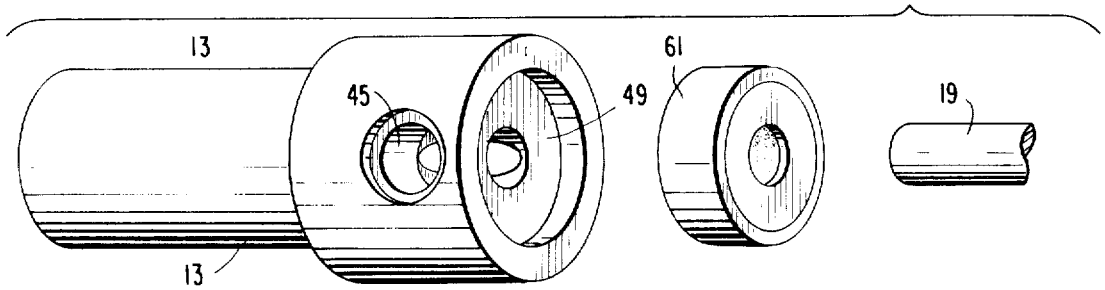
FIG. 6 is an exploded rear perspective view thereof.

Mixing chamber 13 is of unitary construction and comprises a forward barrel 41 of reduced diameter that terminates rearwardly in a radially outwardly extending annular shoulder 43. The portion of mixing chamber 13 rearwardly of shoulder 43 is of relatively large diameter and is traversed by two diametrically opposed coaxial bores 45. At the outer ends of bores 45, enlarged counterbores 47 are provided; while at the rear end of mixing chamber 13, a relatively shallow bore 49 is provided which serves as a counterbore surrounding bore 29 that otherwise extends full length of mixing chamber 13, all of which is best seen in FIGS. 5 and 6.

Barrel 41 is surrounded by a metal sleeve 51 of the same length, whose inside diameter is the same as the outside diameter of barrel 41 and whose rear end 53 is of the same thickness as the radial extent of shoulder 43. Forwardly of rear end 53, sleeve 51 has a forwardly facing annular shoulder 55 thereon, which separates a relatively thin forward portion of sleeve 51 from a relatively thick rear portion of sleeve 51.

Figure 8:
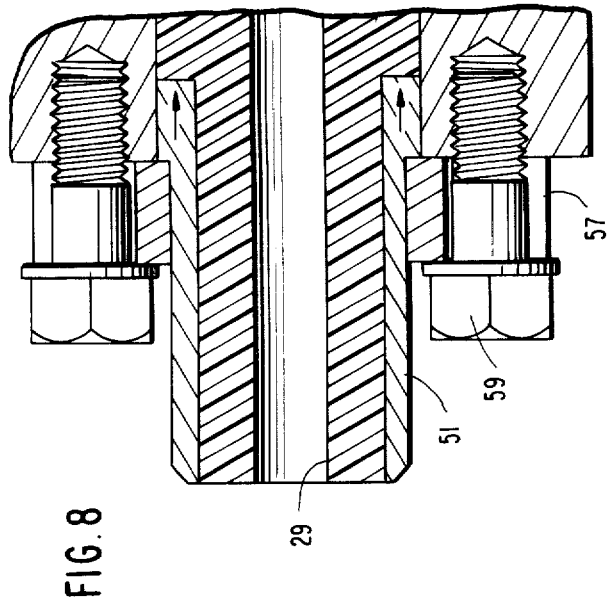
FIG. 8 is a view similar to FIG. 7, but showing the parts in their assembled relationship.
Figure 7:
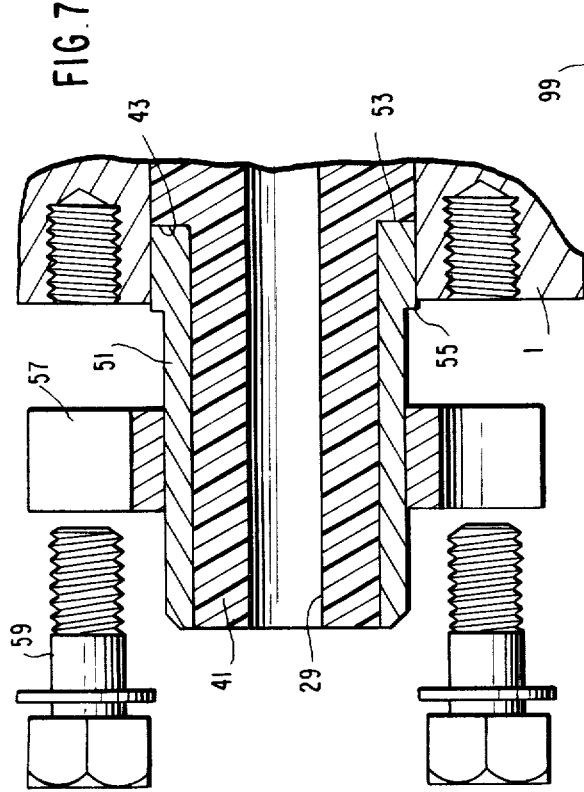
FIG. 7 is an exploded cross-sectional view of the outlet end of the mixing chamber of the present invention and its associated structure.
Figure 9:
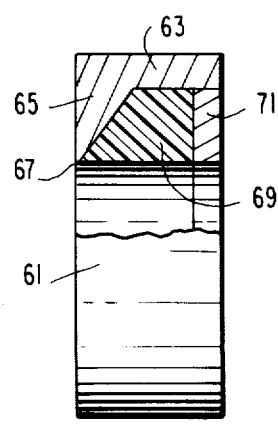
FIG. 9 is an elevational view, partly in section, of the purging rod scraper of the present invention.

As is shown in general in FIGS. 1 and 2, and as is shown in greater detail in FIGS. 7 and 8, a collar 57 is provided whose inner diameter is about the same as the outer diameter of the forward portion of sleeve 51 and that slides over this forward portion of sleeve 51 and comes to rest in its seated position against shoulder 55. Screws 59 are provided, for tightening collar 57 down on gun block 1.

When mixing chamber 13 is fully seated in gun block 1, with sleeve 51 surrounding barrel 41, then shoulder 55 will project slightly from the forward surface of gun block 1, as is shown in FIG. 7. This is a very important feature of the invention. Subsequently, when collar 57 is tightened down on gun block 1, the under surface of collar 57 will first contact shoulder 55 and will force it to the right, in the direction of the arrows in FIG. 8, until collar 57 bottoms out against gun block 1. This forced movement of sleeve 51 to the right as shown in FIG. 8, exerts a compressive stress on plastic mixing chamber 13 and results in a compressive strain of plastic mixing chamber 13, with novel results that will be described hereinafter.

The projection of shoulder 55 forwardly from the adjacent face of gun block 1 need not be great. In FIG. 7, it is exaggerated for purposes of illustration. However, it can be in practice, for example, about 0.005 inch.

THE SCRAPER

A scraper 61 is provided immediately to the rear of mixing chamber 13; and a portion of bore 29 is surrounded by scraper 61. Scraper 61 is in the form of a cylindrical outer sleeve 63 that terminates in a forward wall 65 that has its forward surface disposed in a plane perpendicular to the axis of bore 29 and its rear surface conical and converging radially inwardly with its forward surface to define a relatively thin circular edge 67 whose least thickness, measured axially, can be for example about 0.010 inch. Cylindrical sleeve 63 surrounds and contains a plastic bushing 69 of complementary shape; and a metal washer 71 closes the rear of scraper 61. Washer 71 is force fitted into the assembly and retains plastic bushing 69 therein.

The relatively thin or feather edge 67 permits very close tolerance between the scraper and the purging rod 19, e.g. zero to +0.001 inch, without undue friction or the risk of seizure. Also, the plastic bushing 69 serves to guide the purging rod, and to prevent mixed material from seeping rearwardly.

Scraper 61 is disposed partially in bore 49. That is, the depth of bore 49 is a substantial fraction, but much less than all, the axial extent of scraper 61. Thus, gun head 1 is characterized by three coaxial bores 73, 75, 77, which are also coaxial with purging rod 19. The largest of these, bore 73, receives the larger diameter rear portion of mixing chamber 13. The next larger, bore 75, receives the rear of scraper 61; whilst the third and smallest bore 77 receives a felt wiper 79 which is saturated batchwise with solvent, e.g. ethylene glycol monoethyl ether, that is renewed from time to time through an appropriate access opening (not shown).

The advantage of providing the bore 49 in the rear of the mixing chamber 13, is that this bore permits the scraper 61 to be moved forward as close as possible to the common axis of the valve assemblies 9 and 11. This, in turn, permits the forward end of purging rod 19, in its rearmost position, to be as far forward as possible; and this in turn means that the "dead" space that tends to form behind the axis of the valve assemblies, in which reactive material might otherwise collect and harden, is as small as possible.

One advantage of forming the mixing chamber of plastic, is that the scraper 61 can be received both in bore 49 and in bore 75, without the need for precise machining of the parts: the side walls of bore 75 are comprised by the steel of gun block 1; whereas the outer surface of scraper 61 is the steel of cylindrical sleeve 63. But the side walls of bore 49 are of elastically deformable plastic; and so, if there is any slight axial misalignment of the parts, the difference can be accommodated by deformation of the plastic.

Another advantage of making the mixing chamber of plastic, in combination with the feature of providing the shoulder 43 thereon and the projection of surface 55 forwardly beyond the adjacent front wall of gun block 1 in the undeformed condition of the parts, is that when collar 57 forces sleeve 51 to compress the plastic of mixing chamber 13, as indicated somewhat schematically in FIG. 8, then this compression will be transmitted substantially throughout the plastic material of the mixing chamber, which in this regard behaves somewhat in the manner of an incompressible liquid, that is, is displaceable but not compressible, with the result that the seal between the front wall of scraper 61 and the rear wall of bore 49 is augmented. This prevents the escape of reactive mixture radially outwardly between scraper 61 and mixing chamber 13.

The scraper 61 is also improved by virtue of a number of the features previously mentioned. For one thing, the taper of forward wall 65 permits the edge 67 to be as thin as desired without losing strength. That same taper also urges plastic bushing 69 radially inwardly into sealing relationship with purging rod 19, so that reactive mixture cannot escape rearwardly along rod 19 even in the rearmost position of rod 19, in which the forward end of rod 19 is preferably in the plane of the forward surface of wall 65 of scraper 61 or in any case not more than 0.007 inch behind that plane if the thickness of scraper edge 67 is 0.010 inch.

It is also to be noted that cylindrical sleeve 63 performs the dual function of supporting forward wall 65 and of confining plastic bushing 69.

THE VALVE ASSEMBLIES

Figure 3:
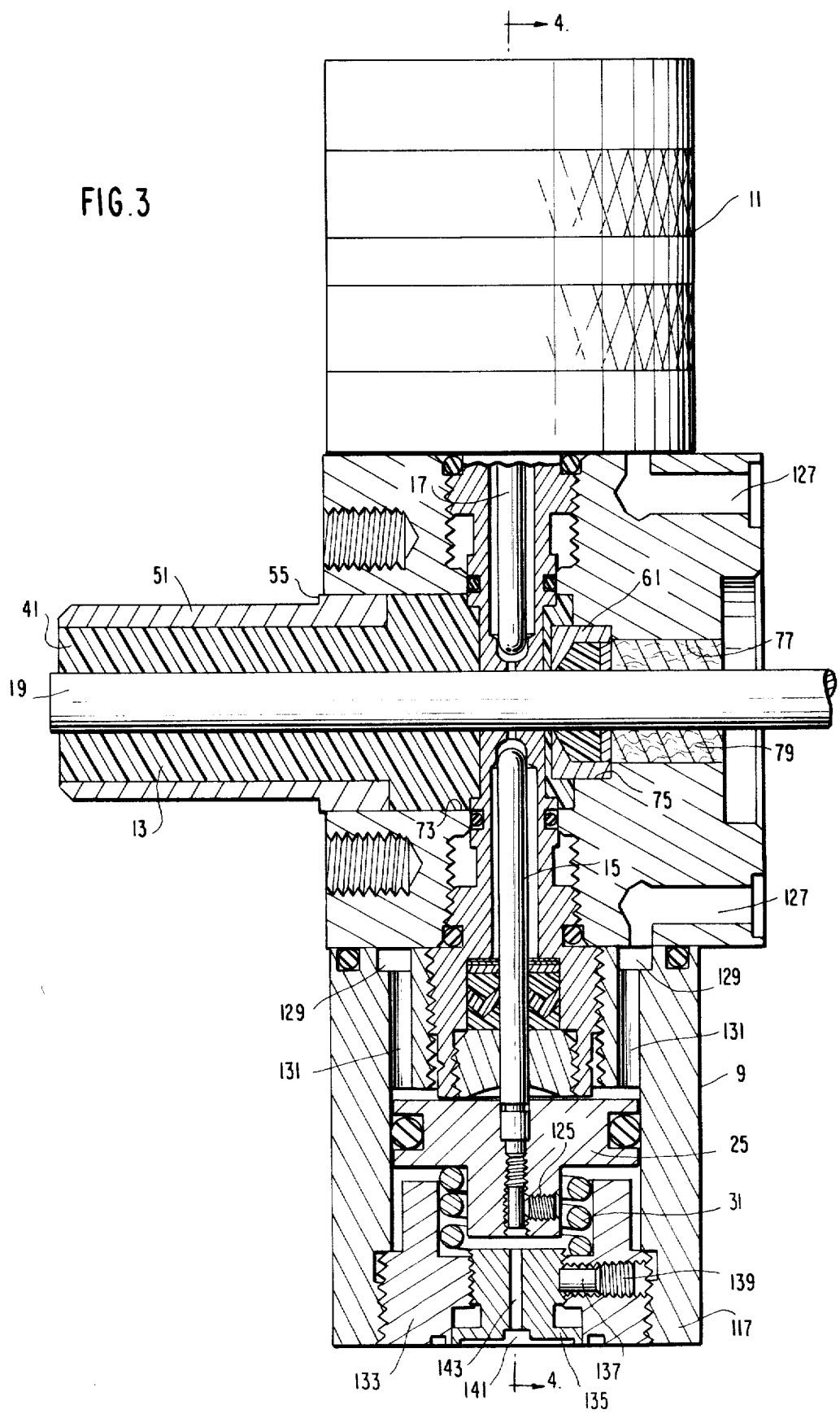
FIG. 3 is an enlarged fragment of FIG. 2.
Figure 4:
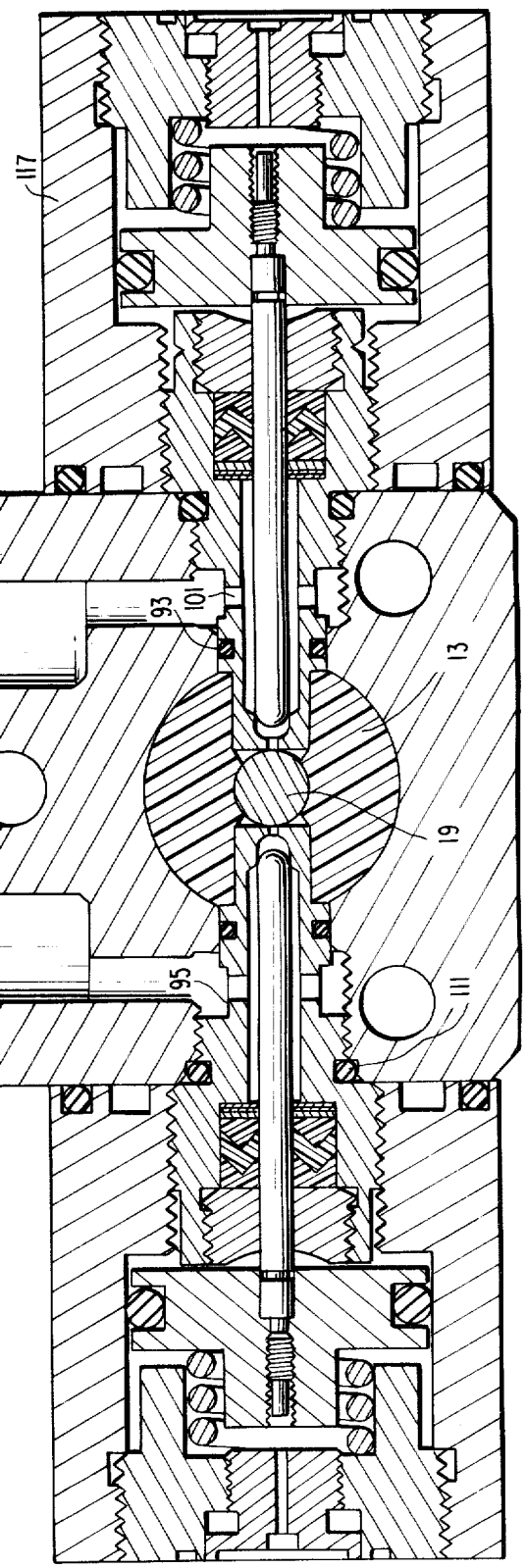
FIG. 4 is a cross-sectional view taken on the line 4—4 of FIG. 3.
Figure 10:
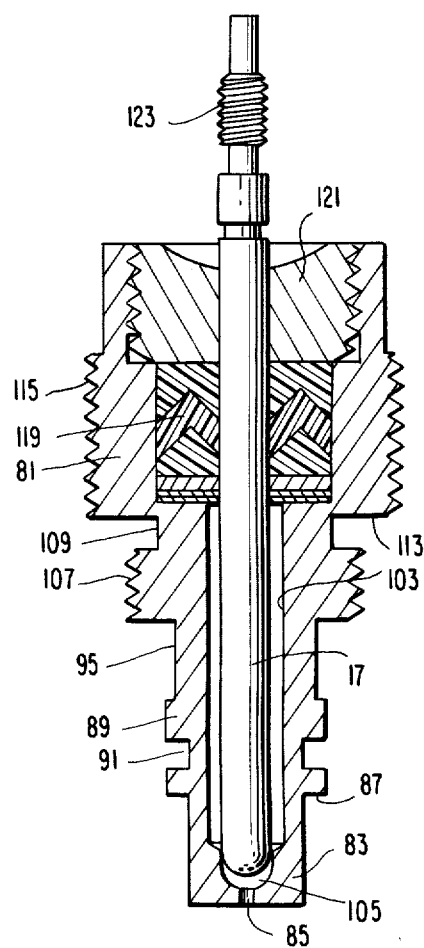
FIG. 10 is a cross-sectional view of one valve assembly of the present invention, with its associated piston removed.

Valve assemblies 9 and 11 are best seen in FIGS. 3, 4, and 10. As previously pointed out, they are substantially identical; and so the description of one will suffice for the other.

Referring first to FIG. 10, it will be seen that the valve housing comprises an injection chamber 81 which is generally a figure of revolution and terminates inwardly of the mixing chamber in a cylindrical tip 83 which has a relatively small axial orifice 85 therethrough from which the associated one of the two reactive liquids is emitted into bore 29 of mixing chamber 13. Notice that tip 83 is at the bore. This places orifice 85 as close as possible to purging rod 19, which is very important in order to reduce the amount of hardenable mixture that can remain in the gun when rod 19 is in its forward position.

Tip 83 is delimited by a radially outwardly extending annular shoulder 87 which forms the inner surface of an enlargement 89 that projects beyond gun head 1 and into counterbore 47 with a crush fit. This is to say that, when injection chamber 81 is fully seated in gun block 1, not only does tip 83 extend through bore 45 into close adjacency with purging rod 19, but also shoulder 87 compresses the material at the bottom of counterbore 47, elastically deforming it and ensuring a tight seal between injection chamber 81 and plastic mixing chamber 13. In this way, mixed liquid cannot seep between injection chamber 81 and plastic mixing chamber 13 past shoulder 87; and this is another very important feature of the present invention. The magnitude of the crush fit between shoulder 87 and the bottom of counterbore 47, is that distance between the point of contact of shoulder 87 with the bottom of counterbore 47, and the distance that injection chamber 81 still has to move axially of itself, to be fully seated in gun block 1. This distance can for example be 0.012 to 0.017 inch.

Enlargement 89 is provided with an annular outwardly opening recess 91 therein that receives an O-ring 93 that seals against gun block 1.

Moving farther outwardly along injection chamber 81, there is an annular outwardly opening recess 95 that communicates with one of a pair of inlets 97 and 99 (see FIG. 4) that extend downwardly through gun block 1 from the top of gun block 1 to their lower end in the associated recess 95. Inlet 97 is the inlet for hardener from hose 33; while inlet 99 is the inlet for resin from hose 35. The respective liquid passes from its inlet 97 or 99, into annular recess 95 in which it can move about the circumference of injection chamber 81 and in through each of a plurality of inlets 101 bored through the side wall of injection chamber 81 (see FIG. 4) and thence into a bore 103 that extends axially of injection chamber 81. Bore 103 is of substantially greater internal diameter than the external diameter of the associated needle valve 15 or 17, so that the needle valve is continuously surrounded by the associated liquid. However, each bore 103 terminates radially inwardly in a counterbore 105 of reduced diameter, whose radially inner end has the same configuration as that of the tip of the associated needle valve 15 or 17. Thus, if as in the illustrated embodiment the needle valve has a semispherical tip, then counterbore 105 correspondingly terminates radially inwardly in a semispherical bottom at whose apex is orifice 85. However, it is of course to be understood that the tips of the needle valve, and correspondingly the counterbores 105, could have other shapes such as conical, etc. It will also be understood that when needle valve 15 or 17 is fully seated radially inwardly in its associated counterbore 105, the orifice 85 is effectively completely closed against the flow of liquid therethrough; but that when the tip of the needle valve is withdrawn outwardly from contact with the side walls of counterbore 105, then there is a free space entirely about the needle valve, and inwardly of the tip of the needle valve, through which liquid can flow freely through bore 103 and counterbore 105 and out through orifice 85 into the mixing chamber bore 29.

It is to be noted at this point, that the valving of the liquids is performed entirely by the needle valves, and not at all by purging rod 19. Thus, rod 19 performs only a purging action and not a valving action. As a result, the rod 19 can be looser in the mixing chamber 13 than if it had to perform a valving action and can in fact have a diametric interference fit with the deformable plastic side walls of bore 29, of e.g. −0.0015 to −0.006 inch, preferably −0.002 to −0.004 inch.

Moving again outwardly along injection chamber 81, there is encountered an enlarged screw-threaded portion 107 whose screw threads, mating with corresponding internal screw threads in gun block 1, provide the principal securement of injection chamber 81 to gun block 1. Next outwardly beyond portion 107 is an outwardly opening annular recess 109 in which is disposed an O-ring 111, the far side of recess 109 being extended radially outwardly in a shoulder 113 which comes into contact with an outer surface of gun block 1 to determine the fully seated position of injection chamber 81 in gun block 1. It is in this position, as previously noted, that shoulder 87 resiliently deforms the bottom of counterbore 47 into compressed and sealing condition.

The two O-rings 93 and 111 provide seals for preventing the escape of liquid along injection chamber 81. However, the leakage that they prevent is leakage from annular recess 95 in either direction along injection chamber 81: they do not prevent leakage from bore 29, because the crush fit of shoulder 87 fully performs this function.

Next outward along injection chamber 81 is a further enlarged portion with external screw threads 115, which engage with internal screw threads on a sleeve 117 one of which encloses each of the valve assemblies 9 and 11. Internally of injection chamber 81, in this region, is provided chevron packing 119 and a retainer 121 screw threaded in the outer end of injection chamber 81, to retain packing 119 in place. Packing 119 thus slidably guides the associated needle valve 15 or 17, while at the same time preventing the leakage of liquid along the outer surface of the needle valve.

Notice that injection chambers 81 extend all the way through mixing chamber 13 in contact with the plastic of the mixing chamber. This feature coacts with the axial compression of the mixing chamber to augment the seal about the injection chambers.

At the outer end of each needle valve 15 or 17, screw threads 123 are provided (see FIG. 10) on which the associated piston 25 is screw threadedly retained. A set screw 125 (see FIG. 3) carried by each piston 25 bottoms against the shank of the associated needle valve, to prevent unscrewing of the piston from the needle valve.

Referring further to FIG. 3, there will be seen air inlets 127, one individual to each valve assembly 9 and 11. Inlets 127 receive compressed air from air inlet 21 when lever 23 is pulled, and transmit it to an annular groove 129 in the mating surface of each sleeve 117. From each groove 129, plural passageways 131 extend through sleeve 117 to supply air to the underside of piston 25, to press the pistons 25 simultaneously away from each other against the action of springs 31. Thus, one end of each spring 31 bears against its associated piston 25; whilst the other end of the spring is received in a recess in a plug 133 that is screw threaded into the outer end of each sleeve 117. Screw threaded into each plug 133 is a stop 135 whose inner surface is adapted to contact the outer end of the piston 25 to limit the outward movement of piston 25 and hence the valve opening stroke of each needle valve 15 or 17. A plastic plug 137 is disposed in a radial bore in plug 133, to contact stop 135 to prevent its free rotation; and a set screw 139 regulates the braking pressure that plug 137 exerts against stop 135.

A slot 141 is provided diametrically across the outer surface of stop 135, to receive the tip of a screw driver so as to permit adjustment of stop 135 toward and away from piston 25 to change the throw of the needle valves, which in turn regulates their back pressure and hence the total liquid delivery rate. An air passage 143 opens what would otherwise be the dead space on the outer side of piston 25, and so permits piston 25 to move freely without having to counteract either an air cushion or a vacuum.

AIR NUCLEATION

It is known in this art to employ a technique called "air nucleation". The technique of air nucleation comprises blowing air under pressure into the mixing chamber to influence the cell structure of the foaming hardenable mixture. See for example U.S. Pat. No. 4,053,283.

When equipment of the type of the present invention is used, for example, for packaging or for dispensing urethane foam, air nucleation will ordinarily not be used. However, in the case of dispensing, for example, a polyurea foam, air nucleation will often be used. Polyurea foams are often used, for example, in the application of insulating material between existing walls (so-called "housing retrofit"), because they expand with less force and so do not damage the walls that confine them.

Figure 11:
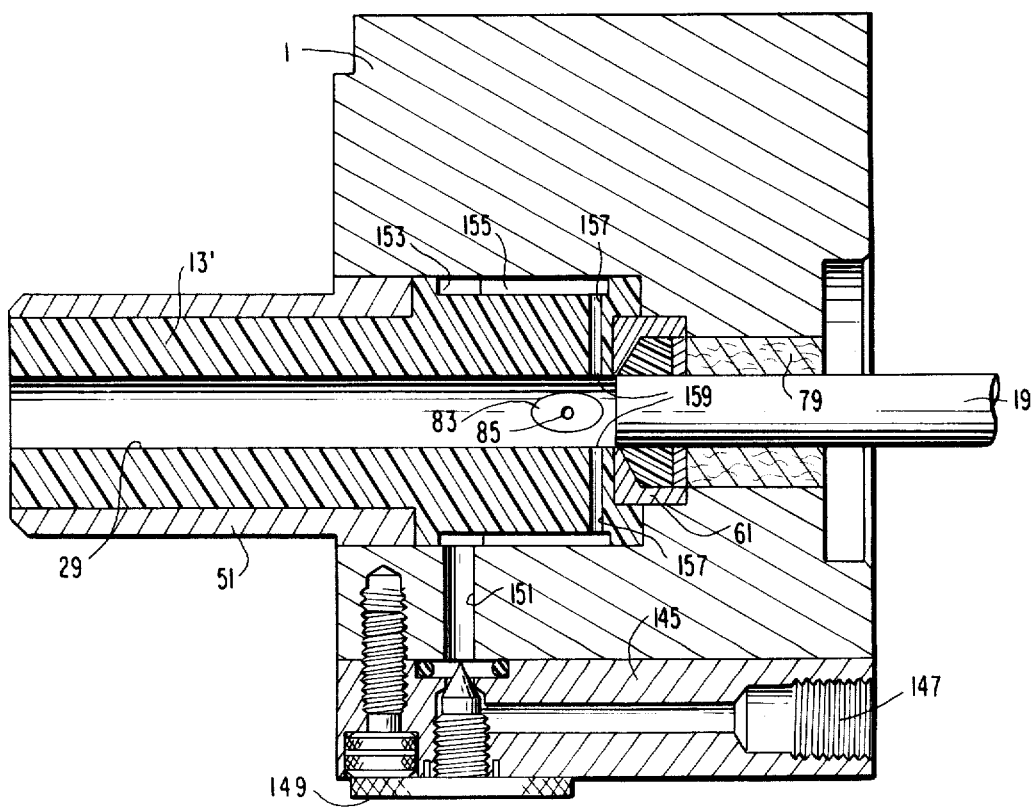
FIG. 11 is a cross-sectional view of a modified form of that portion of the apparatus of the present invention which is in the vicinity of the mixing chamber, illustrating provision for so-called air nucleation, in which air is injected into the mixture to influence the cell structure thereof.
Figure 12:
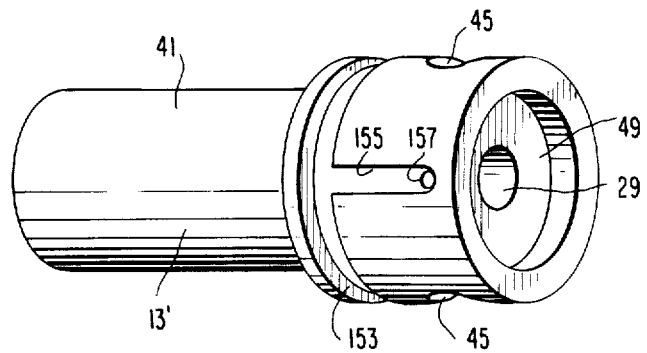
FIG. 12 is a rear perspective view of the mixing chamber adapted for air nucleation, shown in FIG. 11.

The present invention provides novel air nucleation structure illustrated in the alternative embodiment of FIGS. 11 and 12. As is there seen, an air nucleator 145 is provided, which is an attachment to the gun head 1. Air under pressure is fed through inlet 147 (again under the control of trigger lever 23) and flows thence past an adjustable needle valve 149 and into a radial passageway 151 through gun head 1. Passageway 151 communicates at its inner end with an annular recess 153 that girdles mixing chamber 13' (see FIG. 12). Mixing chamber 13', in turn, has a plurality of lengthwise extending outwardly opening grooves 155 in its outer surface, which, closed outwardly by the adjacent inner surface of bore 73 of gun head 1, comprise rearwardly extending passageways which at their rear end communicate with the radially outer ends of radial passageways 157 that open through air inlet openings 159 into the rear end of bore 29 of mixing chamber 13', at a distance behind the orifices 85 through which the liquids enter, and just immediately in front of the forward side of scraper 61 which also defines the plane in which the forward end of purging rod 19 is disposed in its rearmost position. The radial passageways 157 are of course peripherally staggered relative to the valve assemblies so as to avoid interference therewith. Thus the nucleation air enters bore 29 just forwardly of the purging rod and perpendicular to the purging rod, through a wall of the mixing chamber which is swept by the purging rod. Accordingly, the nucleation air inlet openings 159 of the present invention are swept clean of reactive material by the purging rod, which cannot happen when the air inlet is in the purging rod itself, as in U.S. Pat. No. 4,053,283.

ALTERNATIVE FORM OF INJECTION CHAMBER

Figure 13:
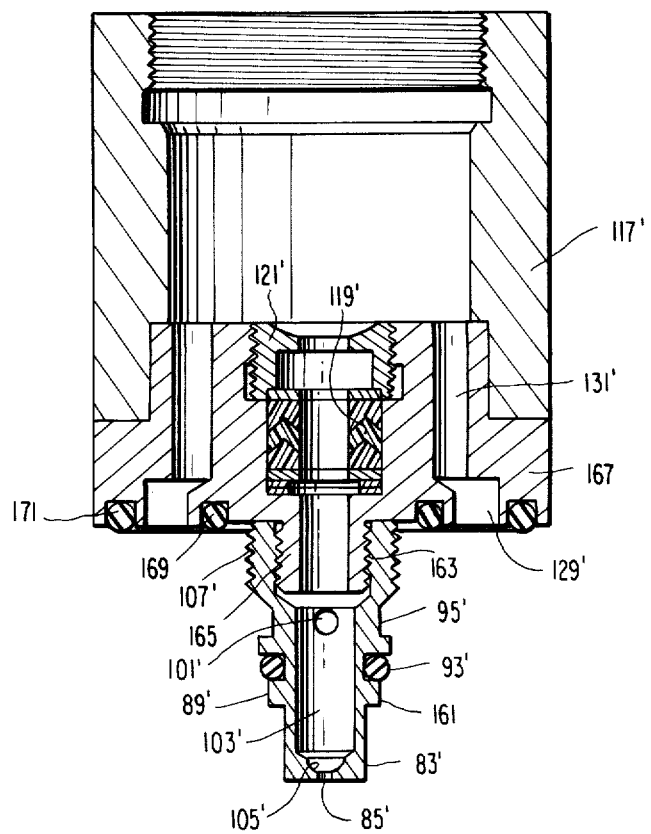
FIG. 13 is a cross-sectional view of an alternative form of valve assembly, with the needle valve omitted, of two-part construction.

An alternative form of injection chamber is shown in FIG. 13, characterized principally that it is in two separable parts. In FIG. 13, the same or comparable parts are designated by primed reference numerals, as are found in the previous figures.

Thus, in the FIG. 13 embodiment, the inner end of the injection chamber, which bears the seat 105' for the needle valve and the orifice 85' for the liquid, is in the form of a detachable tip 161 which at its outer end has internal screw threads for engagement with external screw threads 163 on a nipple 165 that extends inwardly from a base 167. The base 167 of this embodiment thus corresponds to the enlarged screw threaded portion 115 of the embodiment of FIG. 10, plus the inner end of the sleeve 117 shown in FIGS. 3 and 4.

The need to provide concentric screw threading on the inner and outer surfaces of the outer end of tip 161, makes it inconvenient to provide a recess such as recess 109 with its O-ring 111, as in the preceding embodiment. Therefore, the O-ring 111 is in effect moved, into one of a pair of radially extending engagement surfaces between gun block 1 and base 167, and appears as the O-ring 169 in FIG. 13. A concentric outer O-ring 171 completes the seal for the air under pressure which enters annular groove 129' and traverses passages 131' on its way to the underside of the corresponding needle valve piston 25.

Making the injection chamber in two pieces, as in FIG. 13, with a detachable tip, has a number of advantages. In the first place, the orifice and valve seat 85', 105' are in a smaller piece which is easier to machine with the tool positioned much closer to the working surface of the workpiece. In the second place, the tip can be detached from base 167 with the needle valve and its packing remaining in base 167. The orifice can then be cleaned without disturbing the packing. In the one-piece embodiment, however, the needle valve has to be removed and the cleaning tool inserted through the packing, in order to get to the valve seat to clean it; and this can damage the packing. Naturally, if the packing becomes damaged, then although hardenable mixture will not leak past the packaging, nevertheless, one of the components can leak past the packing. If this component is, say, the isocyanate component of a polyurethane foam, then upon exposure to air, the isocyanate can harden and plug the gun, although of course not so quickly as would the mixture of liquids.

In view of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Apparatus for dispensing a mixture of mutually reactive liquids, comprising a metal housing, a plastic mixing chamber disposed in the housing, the mixing chamber having a bore therethrough, means to deliver mutually reactive liquids along separate paths through said housing and mixing chamber and into said bore to mix in said bore and be dispensed through one end of said bore, and means pressing on the plastic mixing chamber in the direction opposite the direction in which said liquids leave the bore, to compress the plastic mixing chamber in the housing, the metal housing having a surface thereon that contacts the plastic mixing chamber and that faces in the direction in which said liquids leave the bore, said pressing means pressing the plastic mixing chamber against said surface, and said pressing means and said surface contacting said plastic mixing chamber on opposite sides of the points of introduction of said liquids into said bore with respect to the direction in which said liquids leave the bore.

2. Apparatus as claimed in claim 1, and a purging rod that reciprocates in said bore to clean the bore.

3. Apparatus as claimed in claim 2, and a scraper that surrounds the purging rod to clean the purging rod when the purging rod is retracted, the scraper being disposed in a counterbore in the plastic mixing chamber.

4. Apparatus as claimed in claim 3, a portion of said scraper protruding rearwardly from said counterbore and being disposed in a counterbore in said metal housing.

5. Apparatus as claimed in claim 1, said means pressing on the plastic mixing chamber comprising an abutment shoulder on said plastic mixing chamber between said one end of said bore and the points of introduction of said liquids into said bore, and means to force said abutment shoulder in said opposite direction.

6. Apparatus as claimed in claim 5, said abutment shoulder being annular, the last-named means being a metal sleeve that surrounds said mixing chamber.

7. Apparatus as claimed in claim 6, said sleeve having an abutment shoulder thereon that protrudes from said housing in the uncompressed condition of said plastic mixing chamber, a collar that surrounds said sleeve and bears against the last-named abutment shoulder, and means to tighten said collar down on said housing.

8. Apparatus as claimed in claim 1, said means to deliver liquids comprising a metal valve housing for each said liquid, and a valve in each valve housing, the valve housings extending through the plastic mixing chamber to the bore.

9. Apparatus for dispensing a mixture of mutually reactive liquids, comprising a metal housing, a plastic mixing chamber disposed in the housing, the mixing chamber having a bore therethrough, means to deliver mutually reactive liquids along separate paths through said housing and mixing chamber and into said bore to mix in said bore and be dispensed through one end of said bore, said means comprising a metal valve housing for each said liquid, a valve in each valve housing, the valve housings extending through the plastic mixing chamber to the bore, an abutment shoulder on each valve housing that contacts an abutment shoulder on the plastic mixing chamber, and means to force each valve housing in the direction of the bore a distance such that the abutment shoulders of the valve housings first contact the abutment shoulders of the mixing chamber and then upon further movement toward the bore compress the plastic material of the mixing chamber.

10. Apparatus as claimed in claim 9, said abutment shoulders being annular, said abutment shoulders on said mixing chamber being disposed at the bottoms of counterbores in said mixing chamber, said valve housings extending past said abutment shoulders to said bore.

11. Apparatus for dispensing a mixture of mutually reactive liquids, comprising a metal housing, a plastic mixing chamber disposed in the housing, the mixing chamber having a bore therethrough, means to deliver mutually reactive liquids along separate paths through said housing and mixing chamber and into said bore to mix in said bore and be dispensed through one end of said bore, said means comprising a metal valve housing for each said liquid, a valve in each valve housing, the valve housings extending through the plastic mixing chamber to the bore, a purging rod that reciprocates in said bore to clean the bore, and a scraper that surrounds the purging rod when the purging rod is retracted, the scraper being disposed in a counterbore in the plastic mixing chamber closely adjacent said valve housings.

12. Apparatus as claimed in claim 11, said scraper extending rearwardly of said plastic mixing chamber into a counterbore in said metal housing.

13. Apparatus for dispensing a mixture of mutually reactive liquids, comprising a housing, a mixing chamber disposed in the housing, the mixing chamber having a bore therethrough, means to deliver mutually reactive liquids along separate paths through said housing and mixing chamber and into said bore to mix in said bore and be dispensed through one end of said bore, a purging rod that reciprocates in said bore to clean the bore, and a scraper that surrounds the purging rod to clean the purging rod when the purging rod is retracted, the scraper comprising a cylindrical metal sleeve having a forward wall that extends radially inwardly from the sleeve and that terminates in an inner edge that closely surrounds the purging rod, and packing material in the sleeve behind said forward wall.

14. Apparatus as claimed in claim 13, said forward wall having a conical rear surface such that said forward wall tapers to a least thickness at said inner edge.

15. Apparatus as claimed in claim 14, said packing material being an elastically deformable plastic and having a conical forward surface complementary to and in contact with said conical rear surface of said forward wall.

16. Apparatus as claimed in claim 15, and a metal washer in said scraper behind said plastic packing material and closing the rear end of said sleeve.

17. Apparatus for dispensing a mixture of mutually reactive liquids, comprising a housing, a mixing chamber disposed in the housing, the mixing chamber having a bore therethrough, means to deliver mutually reactive liquids along separate paths through said housing and mixing chamber and into said bore to mix in said bore and be dispensed through one end of said bore, said means comprising a valve housing for each said liquid, the valve housings extending through the mixing chamber to the bore, a valve in each valve housing in the form of a reciprocable needle valve that extends substantially full length of the valve housing and opens and closes an orifice in the end of the valve housing at the bore, packing in the valve housing through which the needle valve slides in sealed relationship, and a joint in the valve housing between the packing and the orifice by which the valve housing is divided into two separable sections.

18. Apparatus as claimed in claim 17, said joint comprising interengaging screw threads on said two separable sections.

19. Apparatus for dispensing a mixture of mutually reactive liquids, comprising a housing, a mixing chamber disposed in the housing, the mixing chamber having a bore therethrough, means to deliver mutually reactive liquids along separate paths through said housing and mixing chamber and into said bore to mix in said bore and be dispensed through one end of said bore, a purging rod that reciprocates in the bore to clean the bore, the end of the purging rod reciprocating between a forward position in which it is at least as far forward as said end of said bore and a rearward position in which it is spaced a short distance behind the points of introduction of the liquids into the bore, and means to introduce air under pressure radially into the bore through the side wall of the mixing chamber at a point between said points of introduction of the liquids and said rearward position of the end of the purging rod.

* * * * *